United States Patent [19]

Brown

[11] Patent Number: 4,971,439
[45] Date of Patent: Nov. 20, 1990

[54] WAVELENGTH CALIBRATION METHOD AND APPARATUS

[75] Inventor: James R. Brown, Huntington Beach, Calif.

[73] Assignee: Beckman Instruments, Inc., Fullerton, Calif.

[21] Appl. No.: 302,061

[22] Filed: Jan. 18, 1989

Related U.S. Application Data

[63] Continuation of Ser. No. 753,744, Jul. 10, 1985, abandoned.

[51] Int. Cl.$^5$ ............................................. G01J 3/18
[52] U.S. Cl. ............................. 356/319; 250/252.1; 356/328; 356/334
[58] Field of Search ............... 356/300, 315, 319, 323, 356/325, 326, 328, 331, 332, 334; 364/498, 526; 250/252.1

[56] References Cited

U.S. PATENT DOCUMENTS

| | | | |
|---|---|---|---|
| 3,563,656 | 2/1971 | Helms | 356/334 |
| 3,973,849 | 8/1987 | Jackson et al. | 356/320 |
| 4,305,663 | 12/1981 | Perkins et al. | 356/325 |
| 4,352,561 | 10/1982 | Tohyama et al. | 356/334 |
| 4,519,706 | 5/1985 | Morley et al. | 356/319 |
| 4,669,878 | 6/1987 | Meier | 356/319 |

OTHER PUBLICATIONS

Papadakis et al., *Analytical Chemistry*, vol. 47, No. 9, Aug., 1975, pp. 1644–1649.
Morgenthaler et al., *American Laboratory*, vol. 8, No. 8, Aug., 1976, pp. 37–45.
West et al., *American Laboratory*, vol. 9, No. 3, Mar., 1977, pp. 37, 38, 40, 42–46, 48, 49.

*Primary Examiner*—F. L. Evans
*Attorney, Agent, or Firm*—William H. May; P. R. Harder

[57] ABSTRACT

A calibration method and apparatus for economical and rapid calibration of a scientific instrument utilizing a monochromator to generate monochromatic light utilizing controllable means for determining the angular position of a light dispersing element in the monochromator and a filter having a narrow absorption band(s) to determine a relationship between the wavelength of the monochromatic light generated by the monochromator and an angular position of the dispersing element so that the dispersing element can be rotated to an exact position for the monochromator to generate a selected wavelength of monochromatic light.

2 Claims, 1 Drawing Sheet

WAVELENGTH CALIBRATION METHOD AND APPARATUS

This is a continuation of application Ser. No. 753,744, Filed July 10, 1985, now abandoned.

BACKGROUND

In a spectrophotometer a beam of light of a selected wavelength or frequency is passed through a medium containing a sample where some of the light is absorbed by the material comprising the sample. Light which passes through the sample medium is received by a light sensitive detector system such as a photometer. Light energy that is not absorbed by the sample results in more light being received by the light detector system. The detector system generates an electrical output signal of a potential or current proportional to the intensity of the light it receives. The output of the light detector system, such as for example one utilizing a photomultiplier tube, is generally an analog current signal proportional to the light intensity received, which thus is proportional to the medium containing the light transmittance of the sample.

The light detector system generally has an amplifier, such as an operational amplifier, to convert the analog current signal from the light detector to an analog d.c. voltage signal. The d.c. voltage signal is processed by additional electronics and applied to a display, such as a chart recorder, to provide a visual and/or permanent record of the sample light transmittance, i.e., absorbance (absorbance $= -\log$ (transmittance) log) at a selected light wavelength or through a wavelength scan.

The light beam is generated from a generally white light source through the use of a monochromator. The monochromator provides a monochromatic beam of light having a range of wavelength within a narrow controlled spectral band. This is generally accomplished by dispersing the white light received into a sweeping spectrum of differing wavelengths of light by directing the white light through a prism or reflecting the light from a dispersion grating. The monochromatic light wavelength generated by the monochromator is selected by rotating the prism or grating to direct light of the desired wavelength in the spectrum through a narrow slit or aperture out of the monochromator and into the optical system of the spectrophotometer. Light of undesired wavelengths is not permitted to pass from the monochromator. Thus, by rotating the dispersing element the light spectrum can be moved across the narrow slit to obtain a selected wavelength monochromatic light for application to the sample medium.

The spectral bandwidth of the monochromatic light generated by the monochromator is determined by the width of the slit, the dispersion function of the dispersing element, and the rotational location of the dispersing element relative to the slit. Change in wavelength of the monochromatic light generated, however, usually does not have a linear relationship with change in the angular position of the dispersing element within the monochromator. That is, the wavelength light generated is not a linear function of the dispersing element's change in angle of rotation. Generally, the wavelength of light generated is related to the rotational position of the dispersing element by the following formula:

$$\gamma = K \sin\theta \quad (1)$$

where,
$\gamma =$ wavelength of monochromatic light
$K =$ dispersion constant, e.g. grating constant
$\theta =$ angular position of dispersing element (from a base position)

In order to obtain accurate performance from the spectrophotometer in analysis of a sample it is very important to be able to accurately generate a select and stable beam of monochromatic light for application to the sample. This requires repeatable and precise positioning of the dispersing element in the proper angular position within the monochromator. Manufacture of the instrument components including the dispersing element and its positioning mechanism, and assembly of these components in the instrument, must be performed with very high precision. A complex, highly precise, and expensive mechanism is necessary to direct the dispersing element. Furthermore, the nonlinear relationship between the rotational change of the dispersing element and the change in wavelength of the monochromatic light generated additionally complicates the positioning mechanism design. Prior designs have incorporated complex linkages, precision cams, and specially designed gears to accomplish approximation of linearity between rotation of the dispersing element and wavelength selection in order to obtain accuracy repeatability and ease of use.

With these designs costly and time consuming calibration procedures are necessary to assure proper optical alignment of the assembly and to correct manufacturing variances in the optical elements. Failure to provide either intensive quality control or calibration would often result in spectrophotometer which was unable to accurately analyze, or reproduce accurately the analysis of, the substances for which it was designed.

A need thus exists in the field of scientific instrumentation which utilizes varying wavelength monochromatic light for a select purpose, and with regard to spectrophotometers in particular, to resolve difficulties associated with the manufacture assembly and control of these instruments by providing accuracy and reproducibility in their function with reduced cost of calibration. This need is fulfilled by the invention as set forth herein.

SUMMARY OF THE INVENTION

The present method for obtaining calibration of the scientific instrument utilizing a monochromator to generate a select wavelength of monochromatic light from generally polychromatic light, comprises the following steps and elements. First, a known light absorbing medium having an absorption characteristic which is clearly identifiable, stable and within a narrow and measurable spectral band is placed in the path of the monochromatic light beam leaving the monochromator in a position approximating that of a sample without interfering with the sample chamber. The absorption characteristics of the medium must be such that it is narrowly receptive to a known light wavelength(s) within an included region of the dispersion spectrum. Many known filters can be utilized for this purpose. Means are provided to selectively position the absorbing medium, e.g. filter, in the light path.

Next, the dispersing element of the monochromator is rotationally controlled in step-wise fashion such that a number of individual step-like angular positions are progressed in determining the position of the dispersing element. The number of individual angular positions measurable should be at least as many as the desired wavelength accuracy of the monochromatic light beam generated by the monochromator. The dispersing element is controlled in its rotational or angular position and record is made of a certain select rotational position(s) of the dispersing element within the monochromator to determine a base rotational position, preferably that at which the monochromator generates a "zero order light" energy. Dispersing element control can be accomplished through use of a stepper motor which is driven by a computer or microprocessor including a memory means for retaining information regarding the selected rotational positions of the dispersing element.

The dispersing element of the monochromator is controlled to an initial position within its scan range of a first order dispersion spectrum, and rotates to scan the spectrum in a direction toward incident light. Rotational position is examined to determine the "zero order light" position of the dispersing element where it substantially reflects the polychromatic light beam it receives. At this position the energy level of the reflected light beam, is of a magnitude many times greater than the energy level of any wavelength of light within the first order of the dispersion spectrum obtainable from the dispersing element. The angular or step position of the dispersing element in the monochromator at the "zero order light" position is identified by the computer and retained in memory as a base position for the dispersing element.

Rotation of the dispersing element is reversed and the element is directed to through a scan to generate a first order dispersion spectrum. The light sensing detector measures the energy level of light passing through the absorbing medium, e.g. filter, as the dispersing element scans. When the dispersing element reaches a rotational position during the scan to generate monochromatic light of a wavelength which is absorbed by the absorbing medium, the light detector indicates a substantial reduction in light energy received producing a change in the output signal. When this change in output signal is received by the computer, the rotational (i.e. step) position of the dispersing element is again examined. The number of step-like increments which it is has rotated relative to the base position is calculated. This position information is entered into the computer memory. Since the light absorbing medium is selected for a known and narrow light absorption band, when the output signal of the light sensing detector changes the rotational position of the dispersing element can be correlated with a spectral band of that certain wavelength monochromatic light. The rotational (i.e. step) position of the dispersing element the certain (absorbed) wavelength light is generated by the monochromator can be used with the base position information to interpolate the required angular position of the dispersing element within the monochromator to generate any other desired wavelength of monochromatic light. Once the base and the absorption positions are found, the interpolation function can be easily accomplished through the known grating function by modern computers or microprocessors.

Preferably, a light absorbing medium is selected which has a plurality of individual light absorption bands so that the rotational position of the dispersing element can be correlated with more than one spectral bandar wavelength of light. Identifying a rotational position of the dispersing element relative to a plurality of monochromatic light wavelengths improves the accuracy of interpretation by which rotational positions of the dispersing element can be determined for other wavelengths of light. It also assures that interferences, such as a light absorbing residual sample material left in the sample compartment, do not affect calibration of the monochromator.

Calibration of the scientific instrument and monochromator utilizing this method is preferably performed each time the instrument is turned on. The simplicity and speed with which the above-described automated method of calibration can be performed makes frequent calibration of the instrument possible. This clearly improves the instrument's ability to accurately perform analysis. Additionally, the instrument can be manufactured with less concern regarding precision of the individual parts and their assembly since the ease and speed of this method of calibration permits the scientific instrument to calibrate automatically, accurately and frequently.

DESCRIPTION OF THE PREFERRED EMBODIMENT

Figure 1:
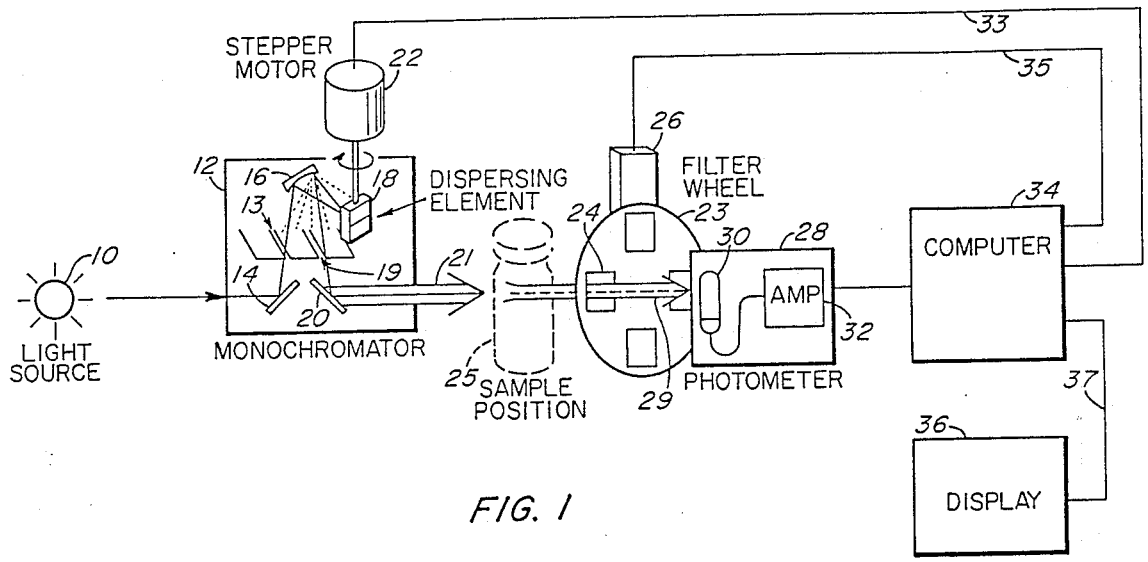
FIG. 1 is a schematic representation of the elements of a spectrophotometer including a stepper motor for directing rotation of the dispersing element of a monochromator and a light absorbing medium (filter) including means for positioning the filter in a sample position.

A spectrophotometer for which the described method of calibration is applicable is schematically depicted in FIG. 1. A light source 10 directs a beam of polychromatic light into a monochromator 12. Within the monochromator the beam of light is redirected by a reflecting element 14 through a first slit 13 to collimate the light. The light is received by a collimating mirror 16 and directed to the surface of a rotatable light dispersing element 18, which is a dispersion grating. The light is reflected from the surface of the grating 18 back to the collimating mirror 16 and redirected through a second slit 19. The light reflected from the grating 18 will generally be dispersed into a spectrum of individual wavelengths of light and the slit 19 permits only a narrow spectral band of light, preferably of a single wavelength, to exit the monochromator. The slit width of the second slit 19 is selected to substantially permit only an individual wavelength or a narrow spectral band of light to leave the monochromator. The monochromatic light beam passing through the slit 19 is received by a second reflecting element 20 and directed out of the monochromator towards the sample position 25, as shown by light beam 21.

The dispersion grating 18 is mounted on the shaft of a stepper motor 22 and the rotational position of the dispersion grating is controlled by the stepper motor. Stepper motors are commonly known in electronic arts and provide a plurality of individual step-like angular positions through which the shaft of the motor may be measurably turned and at which the motor shaft may be stopped. The stepper motor 22 thus provides very accurate control of the angular position of the attached grating 18 and can be utilized to accurately determine and select the angular position of the grating as desired. The stepper motor 22 is controlled and its position determined through input/output line 33 connected to a computer 34. Computer 34 is a typical microprocessor based computer which provides control of and memory facilities for identifying the rotational position of the stepper motor 22, i.e. the grating 18, and directing rotation of the motor shaft to change the angular position of the grating 18.

A light absorbing medium such as a filter 24 is provided for selective positioning in the path of the monochromatic light beam 21 exiting the monochromator 12. The filter 24 is preferably supported in a filter wheel 23 and controlled by a directing means 26. A simple filter wheel design may comprise a plurality of filters and have an open window position, as is commonly known and used in spectrophotometer design. Control of filter wheel position is directed through output line 35 from the computer 34. Control signals from the computer are applied through line 35 to the directing means 26 to position any one of the filters, including filter 24, or the window in the path of the monochromatic light beam 21.

Figure 2:
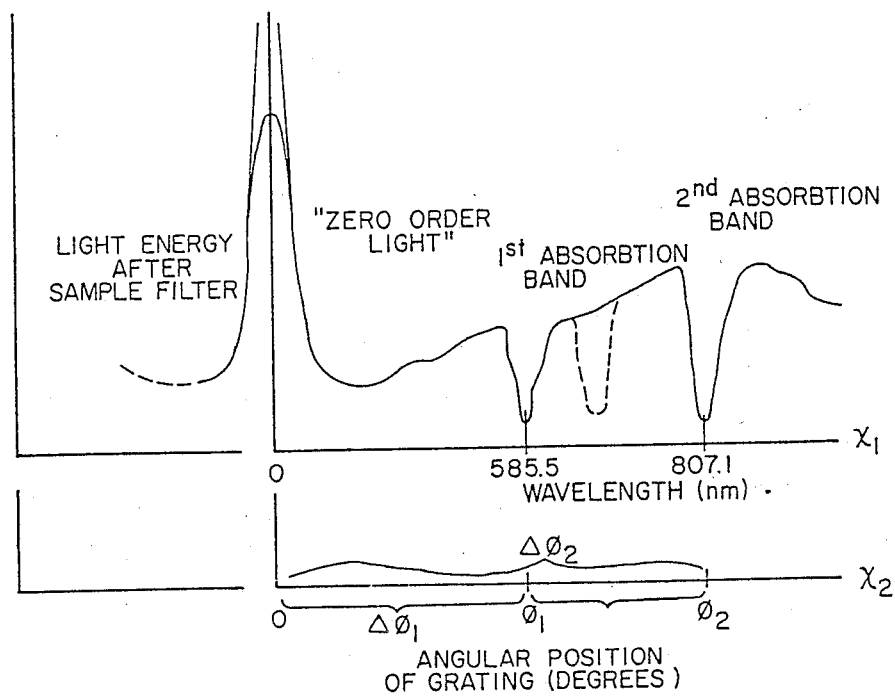
FIG. 2 is a graphical depiction of the absorption characteristics of a light absorbing medium such as a filter having two distinct light absorption bands which is used in performing the described calibration method, with a second horizontal coordinate scale axis correlating the angular position of the dispersing element, e.g. grating, at the absorption bands in terms of angular displacement from a base position at which the dispersing element generates zero order light.

The filter 24 is preferably comprised of didymium glass. Didymium glass has unique absorption characteristics which are depicted in the graph of FIG. 2 where light energy of the light beam 27 having passed through the filter is plotted against the individual wavelengths of the monochromatic light generated by the monochromator as the grating 18 is rotated through a scan of a first order spectrum. As shown, didymium glass exhibits strong and relatively narrow absorption bands about two individual light wavelengths, those being 585.5 nm and 807.1 nm. These two individual and distinct absorption bands can be advantageously used to correlate the rotational position of the grating 18 with a desired wavelength light to be generated by the monochromator 12 through identification of the respective rotational step at which the stepper motor 22 resides when they are detected. This information is then used to define a relationship between the rotational position of the grating 18 and a selection length of light generated.

In FIG. 2, the rotational positions of the grating 18 at which monochromatic light of a wavelength which is absorbed by the filter 24 is generated, is indicated on the second horizontal coordinate scale as $\theta_1$ and $\theta_2$, respectively. These two individual angles are determinable through the stepper motor 22 as a specific step number or number of steps from a base position, as determined by the computer 34 which controls and monitors the stepper motor 22. For instance, once a base position is determined for the rotation of the stepper motor 22, the number of steps through which the stepper motor rotates until a selected signal indicating absorption of light is received from the light sensing detector 30, are countable by the computer 34. In this manner the exact rotational position of the grating 18 can be determined. Similarly, changes in the rotational position of the grating 18 can be accomplished by directing the stepper motor 22, through the computer 34 to rotate a defined number of steps to change the angular position of the grating 18.

The monochromatic light beam 21-27 passing through the filter 24 or sample position 25 is received by a light sensing detector such as photometer 28. The photometer generally comprises a photomultiplier tube 30 (PMT) which generates a current signal in response to the light energy received. The current signal produced by the PMT 30 is applied to an operational amplifier 32 which generates the d.c. voltage signal, which in turn is input to computer 34 providing a measure of light intensity received by the photometer.

A display 36, usually indicating the light energy received by the photometer or information such as transmittance, absorbance or concentration related thereto, is directed by the computer 34 and may include such elements as a chart recorder, an analog scale meter and/or a digital display.

With regard to the spectrophotometer schematically shown in FIG. 1 and the graphical depiction shown in FIG. 2 of the light energy received by the photometer 28 from a monochromatic light beam passing through the filter 24 as the grating 18 is directed to scan, the method of calibration of the spectrophotometer (i.e. the monochromator) proceeds as follows. When the spectrophotometer is turned on the light source 10 is illuminated supplying a light beam to the monochromator 12 and the calibration method begins. The grating 18 is rotated to a selected position as directed by the computer 34 which corresponds to a selected step number for the stepper motor 22 held in the computer memory. The step number is selected to position the grating within or near the end of the first order dispersion spectrum. This step position can be the last step position at which the grating was positioned during the last use of the spectrophotomer. Usually, rotation of the grating in this manner corresponds to moving through the energy profile from left to right in the graphical depiction of FIG. 2.

The grating 18 is next rotated to a position in which it substantially reflects the light directed to its surface, which is known as the "zero order light" position as previously described. There are many means which may be utilized of identifying the "zero order light" position of the grating 18 within the energy (spectral) range of zero order light, such as position sensors, detectors, etc. Preferably, the "zero order light" position of the grating is determined by a method in which the light output of the monochromator is measured to determine the position of the grating 18 at which "zero order" light is generated.

When the "zero order" light position of the grating 18 is found and the grating 18 position therein, the computer 34 assigns the base position, i.e. zero degrees rotation-zero steps, to this rotational position of the grating 18. The step position of stepper motor 22 at this rotational position is entered into the memory of the computer 34. Thus as rotation of the grating 18 is directed by the computer through stepper motor 22, the exact angular position of the grating 18 may be determined through counting the number of steps through which the stepper motor has rotated from the assigned base position. Similarly, the grating 18 may be moved to a desired angular position by rotating the stepper motor to a step number from the base position identified with that desired position.

The grating 18 is rotated to generate a first order dispersion spectrum from the monochromator 12 over a period of time. As the grating 18 moves from the base position the photometer 28 detects the monochromatic light beam 21-27 exiting the monochromator and transmitted through the filter 24. The light energy detected by the photometer 28 corresponds to the graphical depiction of FIG. 2 by moving from left to right along the light energy profile from the "zero order light" position. As the grating 18 continues to rotate the wavelength of the monochromatic light generated by the monochromator increases and reaches a first absorption band as indicated by the first valley in the light energy profile surrounding the 585.5 nm light wavelength. This is identifiable by a substantial reduction in the light energy transmitted by the filter 24, due to the filter's absorbance of light at this wavelength, and thus a reduction in the voltage of the signal output by the photometer 28. The first absorption band of the didymium glass filter is relatively narrow and the angular position $\theta_1$ of the grating 18 may be accurately determined when the voltage level of photometer signal reaches a minimum value. The computer 34 has been maintaining counts of the number of steps which the stepper motor 22 has progressed from the base position in generating the scan to the first absorption band. The angular position of the grating at which monochromatic light of a wavelength within the narrow absorption band is generated is positively identifiable by the step position of the stepper motor 22. This number of steps and step position is recorded in the computer memory. Since it is known that the first absorption band of the didymium glass filter 24 occurs at a 585.5 nm light wavelength, the step position at which the stepper motor resides when the grating 18 first produces monochromatic light which is absorbed by the filter as the first order spectrum is scanned, can be assigned a wavelength value of 585.5 nm by the computer 34. This correlation is retained in the memory of computer 31.

Rotation of the grating 18 is continued until the second absorption band of the didyminum glass filter is reached which is again indicated by a substantial reduction in the voltage of the output signal of photometer 28. This reduction in signal voltage level is caused by the didymium glass filter 24 absorbing a second wavelength of monochromatic light, thus reducing the light energy received by the photometer 28 as indicated in FIG. 2 by the second "valley" or the light energy profile surrounding the 807.1 nm light wavelength. Again the step position of the stepper motor 22 identifying the angular position of the grating 18 is determined, and the step position, i.e. number of steps progressed by the stepper motor, is entered in computer memory. Since it is known that the second absorption band of the didymium glass filter 24 occurs at a 807.1 nm light wavelength, the step position at which the stepper motor resides when the grating produces monochromatic light which is absorbed by the filter 24 for the second time as the first order spectrum is scanned, can be assigned a wavelength value of 807.1 nm by the computer 34. This second step position of the stepper motor correlated with a 807.1 nm wavelength value is retained in the memory of computer 34.

With the zero order light position, the first absorption band position and the second absorption band position of the grating 18 determined by identification of the step position of the stepper motor 22 at which they occur, the computer 34 can easily interpolate the wavelength vs. angular position of the grating relationship and solve the grating constant in Equation (1) discussed above. With the equation value solved, and the retained correlations of grating position at 585.5 nm and 807.1 nm, selection of light of a desired wavelength for sample analysis can be easily accomplished by the computer 34 through utilization of the defined angular position versus wavelength relationship. The grating 18 is rotated by stepper motor 22 to a determined step position calculated through use of the Equation (1) and retained memory information by the computer, so that the monochromator will generate the desired wavelength monochromatic light. This relationship between the wavelength and stepper motor position, i.e. angular position of the grating, can be calculated by a number of known methods applicable to computer statistical processing and generally utilized with and performed by microprocessor based computers as described herein, and known to those skilled in the art.

The filter 24 is now removed from the monochromatic light beam by directing means 26 as controlled by computer 34 and the spectrophotometer is ready for selection of an appropriate wavelength light and sample analysis.

The base position of the grating 18 may be determined in an alternative manner after positioning the filter 24 in the light path of the monochromatic light beam 21 exiting the monochromator, since the absorptive characteristics of the filter 24 are not required in its identification.

Since the calibration of an instrument utilizing the described method is performed each time the instrument is turned on, the accuracy with which the spectrophotometer can perform sample analysis is greatly enhanced. Changes due to environment, contamination use or other events are automatically compensated for since the instrument is newly calibrated each time it is used. Furthermore, the requirements for calibration of the instrument during manufacture and reproducibility of components of identical optical characteristics are greatly reduced since the instrument is capable of automatically calibrating itself each time it is turned on.

What is claimed is:

1. For a scientific instrument, a method for calibrating an angular position of a rotatable light dispersing element used in an optical system to generate a light spectrum from which a substantially monochromatic light beam can be obtained by selectively aligning the rotational position of the light dispersing element, said optical system having a determinable relationship correlating angular position of said dispersing element in the optical system with the wavelength of monochromatic light obtained, said method comprising the steps of:

a. determining a base angular position of the dispersing element by rotating the said dispersing element until zero order light is generated by the optical system;

b. positioning a light absorbing medium in the path of said light beam so as not to interfere with a sample position in the instrument, said medium comprising a material having identifiable light absorbance characteristics relative to light wavelength;

c. rotating said dispersing element to scan a light spectrum through said optical system while detecting the energy level of the scanned wavelengths of monochromatic light obtained;

d. determining the angular position of said dispersing element by detecting a reduced light energy level when monochromatic light of wavelength identifiable by the absorbance characteristics of said light absorbing medium is passed through the light absorption medium in the optical system;

e. correlating the determined angular position of said dispersing element for generation of said identifiable wavelength of light, with the base position of said dispersing element to define a relationship between angular position of said dispersing element and the wavelength of monochromatic light obtained in the optical system by selectively aligning said element.

2. For a scientific instrument, a method for calibrating an angular position of a rotatable light dispersing element used in an optical system to generate a light spectrum from which a substantially monochromatic light beam can be obtained by selectively aligning the rotational position of the light dispersing element, the optical system having a determinable relationship correlating angular position of said dispersing element in the optical system with the wavelength of monochromatic light obtained, said method comprising the steps of:

a. determining a base position of the dispersing element by rotating said light dispersing element until zero order light is generated by the optical system;

b. positioning a light absorption medium in the path of said light beam so as not to interfere with a sample position in the instrument, said medium comprising a material having a plurality of identifiable light absorbance characteristics relative to light wavelengths;

c. rotating said dispersing element to scan a light spectrum through said optical system while detecting the energy level of the scanned wavelengths of monochromatic light obtained;

d. determining a first angular position of said dispersing element by detecting a reduced light energy level when monochromatic light of the wavelength identifiable by a first absorbance characteristic of the light absorbing medium is passed through the light absorption medium in the optical system;

e. determining a second angular position of said dispersing element by detecting a reduced light energy level when monochromatic light of a second wavelength identifiable by a second absorbance characteristic of said light absorbing medium is passed through the light absorption medium in the optical system;

f. correlating the determined angular position of said dispersing element for generation of said first identifiable wavelength of light and the determined angular position of said dispersing element for generation of said second identifiable wavelength of light with the base position of said dispersing element to define a relationship between angular position of said dispersing element and the wavelength of monochromatic light obtained in the optical system by selectively aligning said element.

* * * * *